United States Patent [19]

Mittal

[11] Patent Number: 5,309,969

[45] Date of Patent: May 10, 1994

[54] APPARATUS FOR REPEATABLE ADJUSTMENT OF TIRE PRESSURE

[76] Inventor: Chander Mittal, 2363 S. Arcdale Ave., Rowland Heights, Calif. 91748

[21] Appl. No.: 809,584

[22] Filed: Dec. 17, 1991

[51] Int. Cl.$^5$ .............................................. B60C 23/00
[52] U.S. Cl. .................... 152/415; 137/224.5
[58] Field of Search ............... 152/415, 416, 417; 137/224, 224.5; 364/558

[56] References Cited

U.S. PATENT DOCUMENTS

| | | | |
|---|---|---|---|
| 3,878,376 | 4/1975 | Sholes, Jr. et al. | 137/624.11 X |
| 4,583,566 | 4/1986 | Kalavitz et al. | 152/416 X |
| 4,705,090 | 11/1987 | Bartos | 137/224 X |
| 4,862,938 | 9/1989 | Mittal | 152/417 |

Primary Examiner—Michael W. Ball
Assistant Examiner—Francis J. Lorin
Attorney, Agent, or Firm—J. E. Brunton

[57] ABSTRACT

An apparatus for adjusting the air pressure in a vehicle tire is provided. The apparatus includes an air source, a manifold, a transducer, a valve, and a controller. The valve includes a valve seat with a first and a second chamber and a piston which is movable reciprocally with the valve body between the two chambers. The valve also includes a poppet that is movable between the two chambers relative to the piston with a wobbling action. The piston is connected to the valve body by a deformable diaphragm.

6 Claims, 4 Drawing Sheets

APPARATUS FOR REPEATABLE ADJUSTMENT OF TIRE PRESSURE

BACKGROUND OF THE INVENTION

1. Field of the Invention

The present invention relates generally to a method and apparatus for monitoring and controlling air pressure in pneumatic vehicle tires. More particularly, the invention concerns an improved apparatus for automatically checking tire pressure, checking for tire and system leaks, and for controllably inflating and deflating the tires as conditions warrant.

2. Discussion of the Invention

Various types of systems have been suggested in the past for controllably inflating and deflating vehicle tires during vehicle operation. Such systems typically include a source of air under pressure and controls for selectively increasing or decreasing an existing tire pressure, and for checking to determine the existing tire pressure for each tire. The ability to selectively increase or decrease tire pressure is desirable in connection with optimizing the operation of the vehicle under widely changing conditions including weather, vehicle load, terrain, and vehicle speed. Is also desirable to provide adaptability for isolating the air under pressure in each vehicle tire from the remainder of the system so that a problem such as a leak in one tire does not affect the air pressure in the other tires. Further, in connection with such a tire isolating feature, an air line from the system's source of air under pressure extends to a vehicle tire generally through the fixed axle upon which the tire and its associated wheel assembly are rotatably mounted and across a sealing arrangement between the fixed and rotating parts. The tire isolating valve is preferably between the sealing arrangement and tire so that the sealing arrangement is not subjected to system air under pressure other than at times of operation of the system to accomplish inflation, deflation or pressure checking.

Problems encountered in connection with prior art systems of the foregoing character, have included the inability to detect flat tires and to accurately obtain a predetermined desired tire pressure during inflation or deflation. Other problems have included the inability to achieve inflation or deflation from one tire pressure to another with accuracy and within a reasonable time period, and the inability to provide a system which is efficient in operation both from the standpoint of minimizing operator involvement and of obtaining both the required accuracy and the achievement of rapid inflating and deflating rates. A further problem with the prior art systems is to effectively prevent system failure due to contamination by rubber, dust and other contaminates routinely encountered during vehicle operation.

Efforts to improve accuracy have included the use of complex flow control valves and very slow flow rates of air between the source of air and the vehicle tires. However, such efforts undesirably result in the inability to achieve tire inflating or deflating within a reasonable time period. Moreover, complex flow control valves or valve arrangements are undesirably expensive both to manufacture and to maintain.

One of the most successful pressure monitoring systems ever devised is described in U.S. Pat. No. 4,782,878, issued to the present inventor. While this system was vastly superior to the prior art systems which preceded it, the system was not able to achieve the high levels of precision and control required in many applications as, for example, in certain military applications. Additionally, because the system was primarily analog based, the severe size and weight limitations required in many end-use applications made it inherently unable to provide the flexibility, versatility and accuracy desired.

For example, one aspect of the earlier system which contributed to a lesser degree of accuracy than is achievable by the present system is the fact that measurement of tire pressure in the earlier system was, of necessity, made immediately after the primary control valves were closed and before the system could fully stabilize. This requirement for measurement of the tire pressure prematurely and while the system was in flux resulted because the earlier system had no provision for stabilizing the system pressure prior to processing the transducer output signal. The prior system also lacked the important tire pressure equalizing feature which is present in the invention presently to be described. Absence of this feature further contributed to a lesser degree of overall accuracy.

Another important feature which is present in the present system but was lacking in the prior system relates to the ability of the apparatus of the present invention to detect both a flat tire and any system leakage. Such a feature is highly desirable if not mandatory from a vehicle safety standpoint.

Also absent in the prior system was the ability to properly accommodate high levels of particulate contamination. Field experience has shown that vehicles that are operated with variable tire pressure generate substantial rubber dust in the tires when the tire side walls are folding and unfolding. In fact, it is quite common to generate between one and two cups of this dust between tire changes. This pneumatic valve dust travels to the tire isolating valves and their operating mechanisms causing them to jam or stick. This serious problem is effectively solved in the apparatus of the present invention through a unique electronic modulation of all of the pneumatic valves. This modulation is of a character to create a controlled jarring action at the valves which effectively prevents valve poppet sticking and jamming due to particulate contamination.

There is also no provision in the prior art system for a variable inflate or deflate orifice which comprises an important element of reduction in inflate or deflate times optimized to the application and the apparatus. In the present device, modulation of all pneumatic valves provides the effect of a variable orifice and the frequency of modulation as controlled by the software programs of the system is utilized to achieve optimization.

In addition to providing superior accuracy, greater versatility, the ability to detect system leaks and the ability to accommodate high levels of particulate system, it will become apparent from the description which follows that the apparatus of the present invention also overcomes numerous other drawbacks found in the prior art systems.

SUMMARY OF THE INVENTION

It is an object of the present invention to provide valuable and heretofore unachievable improvements in an apparatus for inflating, deflating, and checking the pressure of air in the pneumatic tires of a vehicle.

Another object is to provide an apparatus of the foregoing character which has the ability to precisely obtain a predetermined desired pressure in the tires of a vehicle during all operating conditions, including widely varying operating temperatures.

A further object of the invention is to provide an apparatus of the character described, which enables inflation or deflation from one tire pressure to another in very short time periods, and while the vehicle is traveling at highway speeds.

Another object of the invention is to provide an apparatus as described in the foregoing paragraphs, which effectively detects both flat tires and system leaks.

Another object of the invention is to provide an extremely versatile system which is compact, highly efficient in operation, and one which requires minimal operator involvement in connection with operation of the apparatus.

Another object is to provide an apparatus which has the ability to check for flat tires and system leaks, to determine the existing tire pressure, to very accurately compare the existing pressure with a desired pressure, and to accomplish highly efficient inflating, deflating and pressure checking procedures in response to such comparison.

Another object of the invention is to provide a system, including specially designed wheel valves, which will accommodate severe particulate contamination and will function accurately and reliably even when rubber dust, fibrous contamination and other particulates invade the system during vehicle operation.

Still another object is to provide an apparatus of the character described, which includes a control system based upon the architecture of a commercially available personal computer where all the apparatus hardware and the cab-mounted display is slave to the software program.

Another object of the invention is to provide an apparatus as described in the preceding paragraph, in which tire inflation and deflation rate is easily adjustable and can be precisely regulated using appropriate software programs.

Yet another object of the invention is, to provide a computer controlled apparatus that is highly stable and will achieve a predetermined target set point without hunting, overshooting or undershooting relative to the set point.

Another object is to provide an apparatus as described in the preceding paragraph, which will automatically pre-measure and tabulate the offset and automatically provide offset correction in a dynamic mode.

Another object of the invention is to provide an apparatus of the class described in which inflation of other tires is blocked if a flat tire is detected and in which means are provided to shut off and isolate each tire from the control system using a novel wheel valve.

Yet another object of the invention is to provide an apparatus embodying a multi-channel control system capable of controlling inflation and deflation of several groups of tires with differing pressure settings.

Still another object of the invention is to provide an apparatus of the character described in the preceding paragraph, in which each channel is independently controlled in all its attributes by a common microprocessor without any cross-talk. This technique is also called multiplexing. To demonstrate this independence, it has been observed that at a given moment of time one channel can effect inflation, another deflation, and a third can check and equalize tire pressure.

DESCRIPTION OF ONE EMBODIMENT OF THE INVENTION

Figure 1:
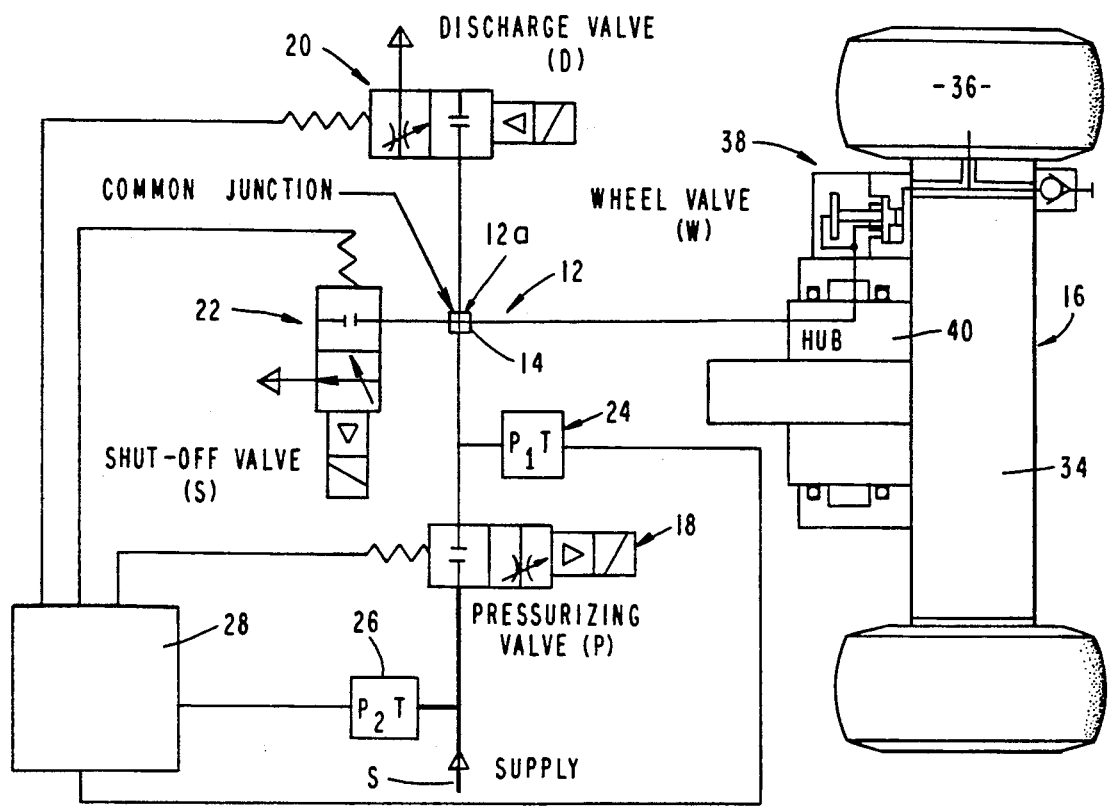
FIG. 1 is a generally schematic view of the apparatus of the invention shown interconnected with one wheel assembly of a vehicle.

Referring to the drawings, and particularly to FIG. 1, one form of the invention is there schematically illustrated. The apparatus is shown in a static mode and can be seen to comprise a manifold assembly generally designated by the numeral 12. The compressor (not shown) is also connected and manifold assembly is operably interconnected with an air supply "S" such as at a common junction 14 with a schematically illustrated wheel assembly generally designated as 16. It is to be understood that, while only a single wheel assembly is shown in the drawings, in actual practice up to eight wheel assemblies can be operably interconnected with the manifold assembly at the common junction 14.

Manifold assembly 12 includes a manifold to which three electronic valves 18, 20, and 22 are connected in a manner to communicate with the chamber of the manifold schematically identified by the numeral 12a. In practice the manifold assembly includes a printed circuit board which acts as an interface between the electronic valves and a controller means which provides appropriate valve actuating signals to the electronic valves. Each of these valves is a two position valve of a standard construction and is readily commercially available. For example, a pilot operated, directional valve sold by Granzow, Inc. is suitable for the present application. An extremely important aspect of the method of the present invention resides in the fact that these valves, in addition to having the normal open and closed positions, can be modulated to provide flow control or a time base custom designed sequence of on and off position at the rate of approximately 30 Hz to produce a pulsating flow. When the valves are controllably modulated in accordance with the method of the invention, a pulsing or jarring effect is produced on the poppets and sleeves of the associated valve means, or wheel assembly valves which will permit the efficient opening and closing of the valves even if the valves are contaminated and jammed with particulate material such as rubber dust or the like or if the system has been inoperative for a long period of time.

In the form of the manifold assembly of the apparatus shown in FIG. 1, first valve 18 comprises a tire pressurizing valve, second valve 20 comprises a tire deflation valve and third valve 22 comprises a shut-off valve. Also forming a part of the manifold assembly 16 are first and second transducers 24 and 26, identified in the drawings as $P_1T$, and $P_2T$. The purpose of these transducers will presently be described.

Figure 7:
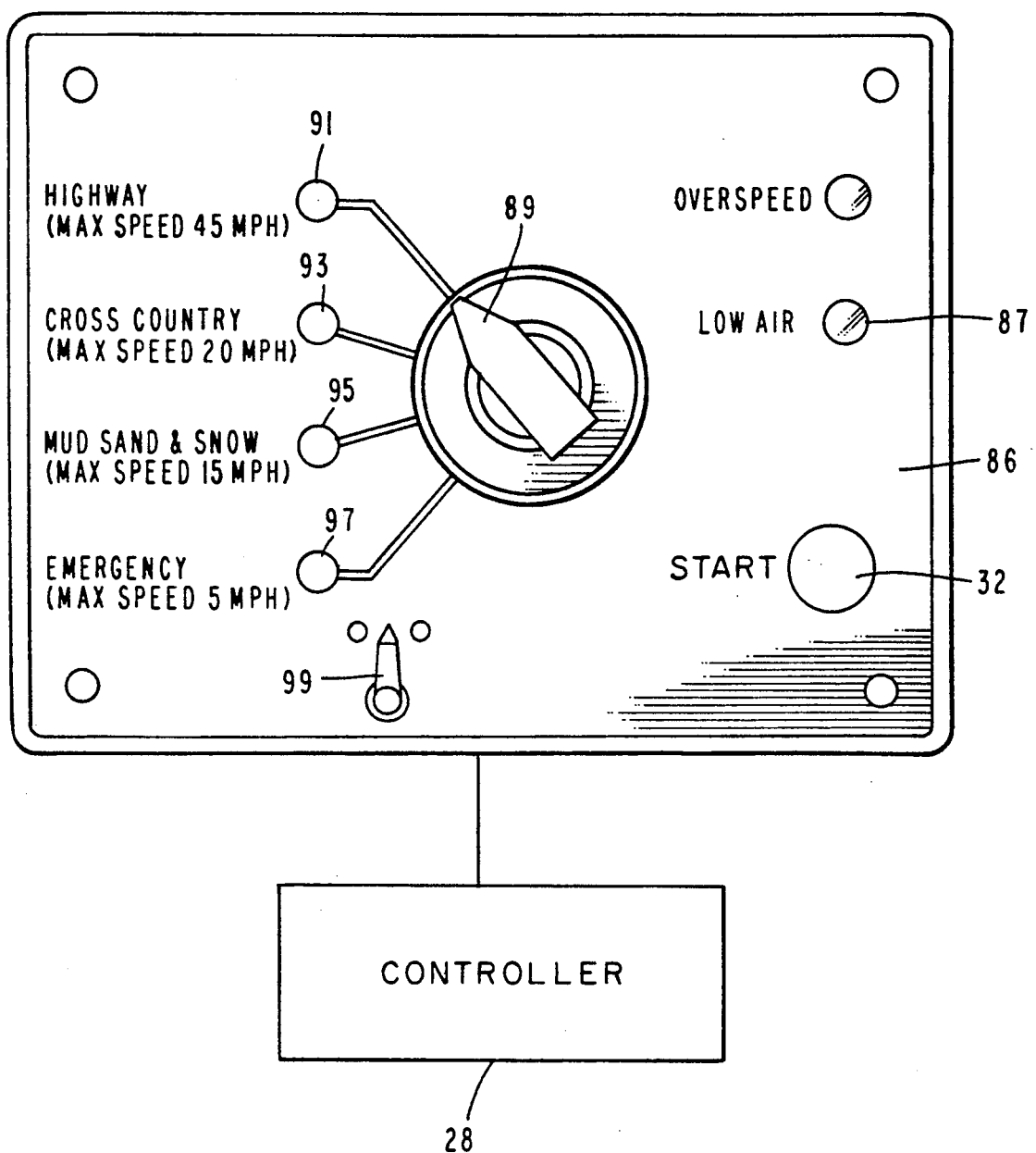
FIG. 7 is a generally diagrammatic view of the cab-mounted control panel of the apparatus of the invention which is operably interconnected with the controller.

Each valve 18, 20, and 22, and each transducer 24 and 26, is electrically interconnected in the manner schematically shown in FIG. 1 with a controller means, here provided as an electronic controller 28. The controller means provides all the electrical signals necessary to selectively actuate the valves and to read the signals produced by the transducers. Controller 28 can take several physical forms, but preferably comprises a microprocessor based electronic digital system, having the same or similar architecture as a standard commercially available personal computer utilizing microprocessor chips (CPU) such as those marketed by Z 80 series, manufactured by S. G .S. Thomson, 68HC11, manufactured by Motorola and 80-86, 80386, manufactured by Intel. As will be discussed in greater detail hereinafter, the input to the controller comprises operator control means including a cab-mounted control panel having a rotary switch and appropriate start-stop controls 32 (FIG. 7). When controller 28 includes an appropriate microprocessor, all operations are accomplished using suitable software. The development of such software is well within the skill of those skilled in the art and since the software forms no part of the present invention, it will not be discussed in detail herein.

Forming a part of the wheel assembly 16 is a rim 34 upon which a pneumatic tire 36 is mounted. Valve means, shown here as a wheel valve 38, is mounted on rim 34 and is connected to manifold assembly 12 through a rotary hub seal 40 of a character well known to those skilled in the art. One form of such rotary hub seal is described in U.S. Pat. No. 4,782,878. The details of the construction and operation of wheel valve 38 will presently be described. However, at this point it should be noted that the wheel valve of the valve means is internally piloted, embodies a unique, free floating poppet and has no electrical connection with the manifold assembly. Importantly the wheel valve is pneumatically opened by the incoming air under pressure and is instantaneously closed by air pressure decay and an associated venturi effect later to be described which is coupled with the jarring action created by controllably modulating shut-off valve 22.

Figure 5:
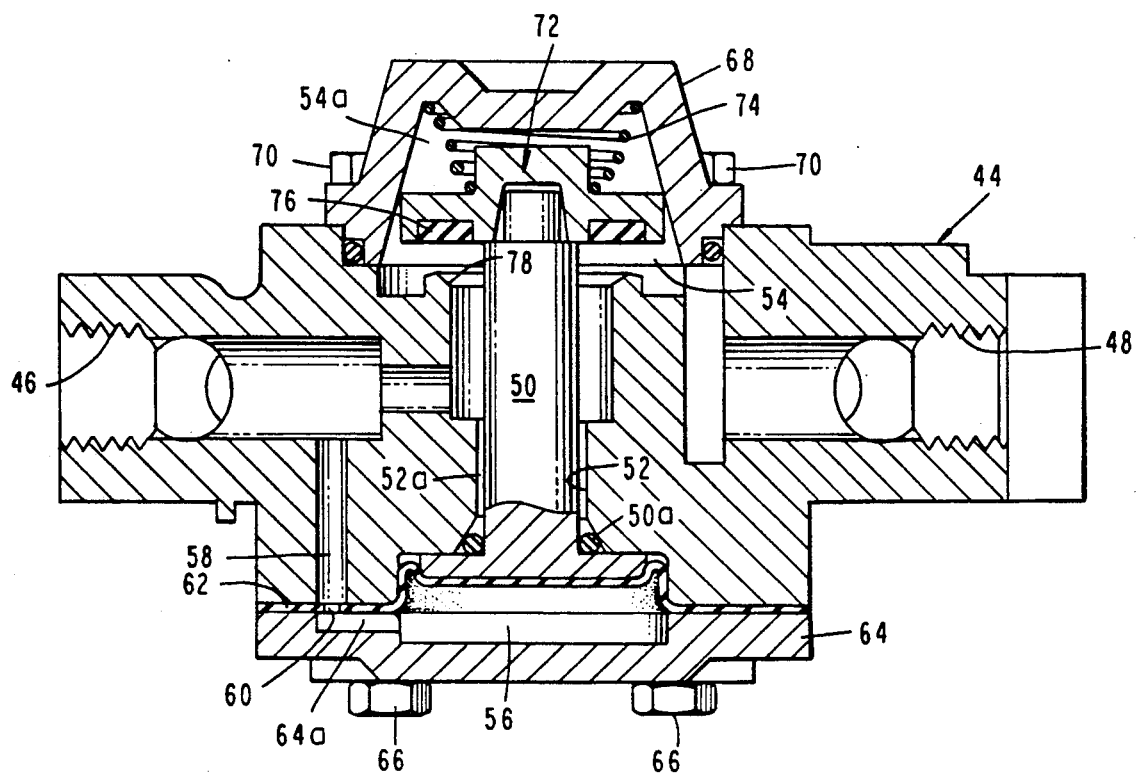
FIG. 5 is a cross-sectional front view of one form of the wheel valve of the apparatus of the present invention.
Figure 6:
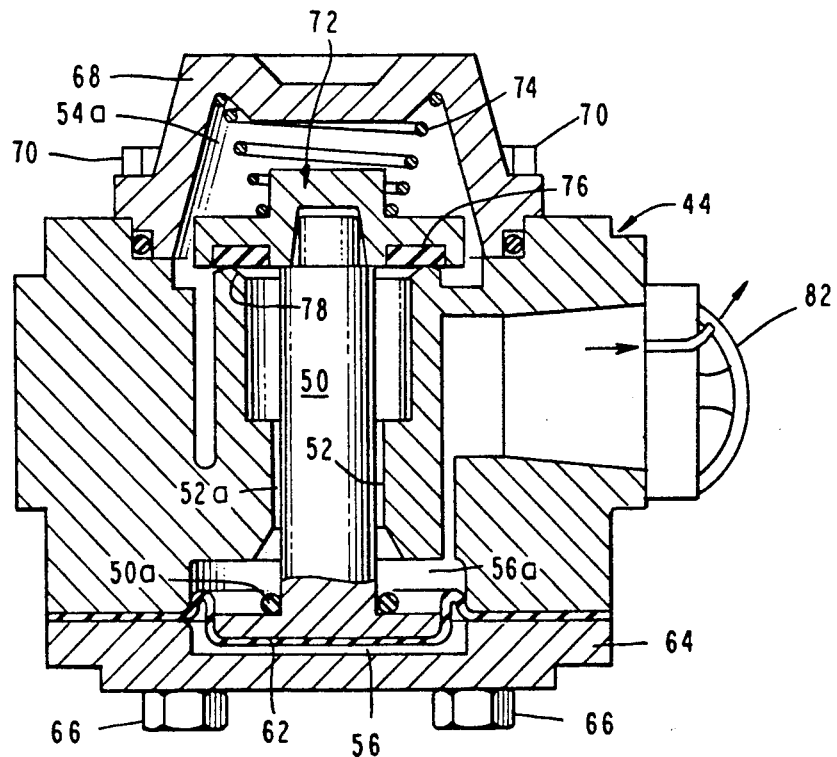
FIG. 6 is a cross-sectional side view of the wheel valve shown in FIG. 5.

Referring to FIGS. 5 and 6, the construction of one form of the wheel valve of the apparatus of the present invention is there illustrated. The wheel valve is an important feature of the present invention in that it is specially designed to reliably operate in a high dust environment and is also uniquely capable of virtually instantaneous closure. In its preferred form, the wheel valve comprises a housing 44 having an inlet passageway 46 and an outlet passageway 48. A piston 50 reciprocates longitudinally within a central bore 52 provided in housing 44. Also formed within housing 44 is an upper chamber 54 and a lower chamber 56. Inlet passageway 46 communicates with chamber 56 via a much smaller passageway 58 and an aperture 60 provided in a one-piece diaphragm 62, the periphery of which is clamped between housing 44 and an end cover 64. End cover 64 is provided with a slot 64a which communicates with the aperture 60 and is interconnected with housing 44 by suitable connectors such as bolts 66. Diaphragm 62, which is constructed from a single piece of any suitable, resiliently deformable sheet of material, extends through chamber 56 and beneath piston 50. Upper chamber 54 is closed to atmosphere by a poppet end cover 68 which is also connected to housing 44 by means of suitable connectors such as bolts 70. Housed within chamber 54 and movable from a first closed position, shown in FIG. 6, to an open position, shown in FIG. 5, is a poppet 72. Poppet 72 is continuously biased toward the closed position shown in FIG. 6 by biasing means provided here in the form of a coiled spring 74. Poppet 72 includes a resiliently deformable sealing member 76 which sealably engages an annular valve seat 78 when the valve is in the closed position shown in FIG. 6. An important feature of the valve design resides in the fact that the poppet 72 freely "floats" within chamber 54, and during the closing stage will tend to "wobble" relative to seat 78. This wobbling action in both a longitudinal and transverse direction, coupled with the modulation of the valve in the manner previously discussed, tends to effectively provide a self-cleaning wiping action between the poppet and the seat. Also a very narrow contact surface between the seat and poppet prevents particulate contaminates within the air flowing through the valve from building up on the poppet and seat in a manner to prevent positive closing of the valve.

The ratio of the pilot to the poppet is preferably on the order of two to one. Therefore, when the pressure in lower chamber 56, which is also the pressure applied to diaphragm 62, is approximately one-half the pressure in portion 54a of upper chamber 54 (that is that portion of chamber 54 above poppet 72 the valve will move into the open position shown in FIG. 5 against the urging of spring 74. This will, of course, permit air to flow from inlet passageway 46, passed the valve seat 78, and into outlet passageway 48. As illustrated in FIG. 5, as the piston moves upwardly, air within chamber 56a which accumulates due to leakage across the annular bore clearance 52a between the piston rod and the valve body 44 (FIG. 6), will be efficiently vented to atmosphere via an umbrella-type relief valve seat generally designated in FIG. 6 by the numeral 82. The purpose of exhausting this air to atmosphere is to prevent any unwanted pressure build-up within the chamber 56a which would tend to decrease the actuating force tending to open the valve. The piston movement also positions the "O" ring 50a to seal off the leakage across the clearance 52a as shown in FIG. 5. This seal-off feature prevents the air from venting to atmosphere for the full duration of the pressure adjustment cycle on a vehicle having eight wheels, the saving is obviously significant enough to effect the total inflation time.

Another unique feature of the wheel valve, which will be described in greater detail hereinafter, resides in the ability of the valve to close almost instantaneously due to the venturi action created at the mouth of the small passageway 58 as air moves rapidly outwardly through passageway 46. This venturi action creates a vacuum in the upper region of passageway 58 which rapidly exhausts the air from chamber 56 permitting the piston 50 to move rapidly downwardly.

System Operation

Figure 2:
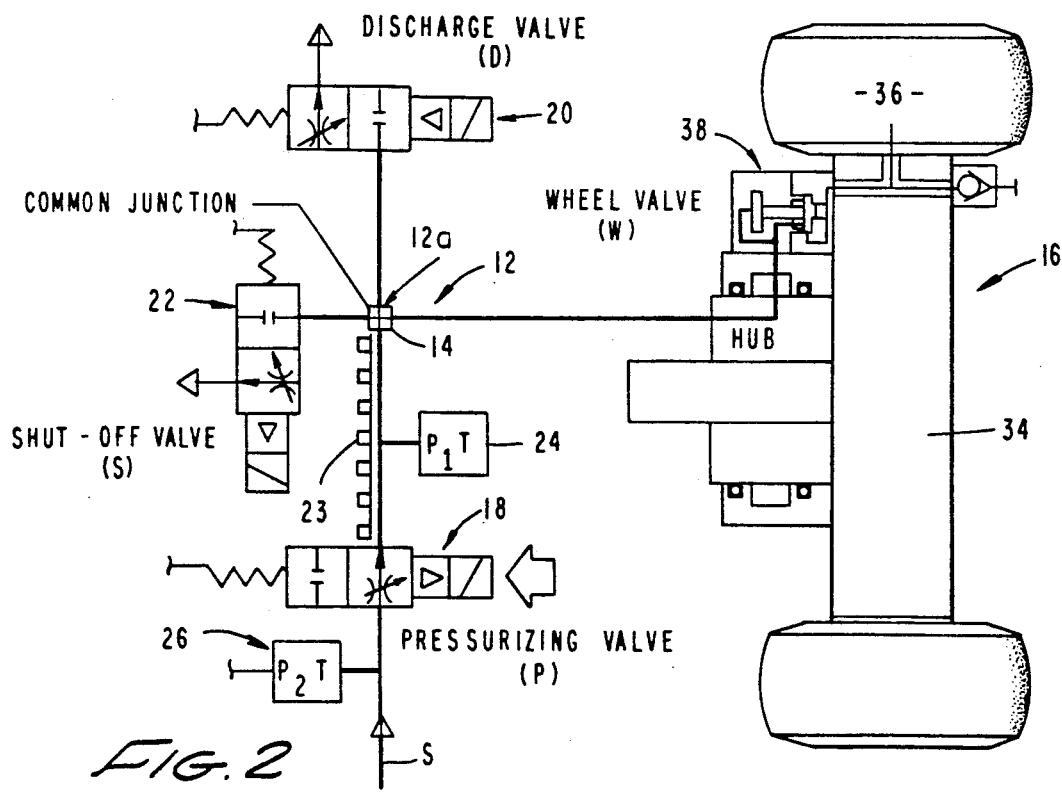
FIG. 2 is a generally schematic view similar to FIG. 1 but showing the pressurizing valve of the device in an open position permitting air to flow through the system toward the vehicle wheel assembly as indicated by the darkened lines in FIG. 2. The square-wave like indicia appearing in FIG. 2 indicates the important modulation of the pressurizing valve of the apparatus to cause a pulsating flow of air toward the wheel assembly of the vehicle.

Four different modes or operational routines are carried out by the controller. These are, leak or flat tire detection, pressurization of all tires, inflation or deflation of selected tires and finally, system shut down. The first leak and flat tire detection subroutine, will be initially discussed. Referring to FIG. 1, at the start of the operating cycle, the controller sends an appropriate signal to the shut-off valve 22 causing the valve to close. Next a signal is then transmitted to the pressurizing valve 18 causing it to rapidly modulate between an open and closed position. This modulation is schematically illustrated by the square wave form 23 shown in FIG. 2. Normally the modulation is accomplished by energizing the solenoid of the pressurizing valve for about 40 milliseconds and then deenergizing it to achieve an off time of approximately one second. At the end of the one second off time, the pressure in the system is measured by transducer 24 and is compared to a leak detect rationale pressure of 6 PSI if the pressure sensed by the transducer is below 6 psi, the controller will repeat another sequence of on-off valve operation and will once again measure the pressure. If the pressure is still below 6 psi, the controller will continue to pressurize the system with 40 millisecond pulses until the 6 psi threshold is met or, in the alternative, until a total time of one minute has elapsed. If a pressure at or above 6 psi is achieved, the system automatically moves on to the next operational sequence. On the other hand, if the pressure fails to reach 6 psi during the one minute control period, it must be assumed that the system is leaking or that a tire has failed. This is because during each 40 millisecond pressurization period the pressure valve 24 allows a small amount of air to flow into the system. If there is no leak in the system or no tire failure, the pressure in the system will, by definition, reach the 6 psi level before the expiration of one minute. Conversely, if there is a leak in the plumbing or if a tire has failed, the small amount of air provided during each 40 millisecond pressurization period will leak out during the following one second off period so that no pressure buildup will result. So long as the leak in the system or in the tire is large enough to prevent a pressure buildup of at least 6 psi, the system will continue to modulate for the full one minute period. At the end of the one minute period, the sequence will terminate and the controller will automatically flash a red light 87 on the operator control panel indicating a system leak. (See FIG. 7)

Assuming that the modulating sequence results in a buildup of pressure in the system to 6 psi, the second operational sequence will be commenced by the controller sending a signal to the pressurizing valve 18 to move to a full open position for a period of about one second thereby permitting a very large flow of air toward the wheel valves. The dramatic increase in pressure achieved during this first pressurization sequence will cause an increase in pressure within chamber 56 of the wheel valve tending to urge the diaphragm 62 and the piston 50 into the valve open position. When the pressure in the system increases to a level greater than one-half the tire pressure, the diaphragm will move the poppet to the position shown in FIG. 5 thereby opening the wheel valve and permitting the flow of air into passageway 48. At the end of the one second time interval, all wheel valves will have opened and the tires will be connected to the common point or common junction 14 of the system. Because tires are at a higher pressure than the system, the system pressure will increase and the pressure in the tires will equalize. At this time, the tire pressure equalization sequence commences. The tire pressure is measured and logged. After 30 seconds, the tire pressure is measured again. If the difference between the first measured pressure and the last pressure is less than ¼ PSI, the tires are considered equalized and the apparatus moves into the next sequence. If the tire pressure difference between the first and the last reading is more than ¼ PSI the system provides another 30 second delay and remeasures the pressure until a difference of less than ¼ PSI is realized. After equalization is completed, the pressure transducer 24 measures the system pressure and compares it to the desired set point. Based upon this comparison, the controller will then initiate an inflate or deflate sequence as the condition requires. Because the transducer measures the pressure while the system is in the static mode, the reading will be true and unbiased by any pressure differential which might exist within the system during a dynamic fill or deflation operational mode.

Considering now the inflation or tire pressure subroutine sequence, if the system pressure as reported to the controller 28 by the transducer 24 is lower than the desired set point or target pressure, the controller will send a signal to the pressurizing valve 18 causing the valve to once again move into a full open position. The controller will also set up the target pressure which is equal to the set pressure minus the offset. As the tires are inflated, the increase in pressure is continuously monitored by the controller through pressure transducer 24 and is repeatedly compared to the target point. When the tire pressure is equal to the target point, the controller signals the pressurizing valve to move into a closed position. After the system pressure equalizes, the transducer once again checks the pressure in the system and compares it with the target point to up date the offset. When this sequencing is complete, the controller will commence the last subroutine, namely the system shut-off routine.

Figure 3:
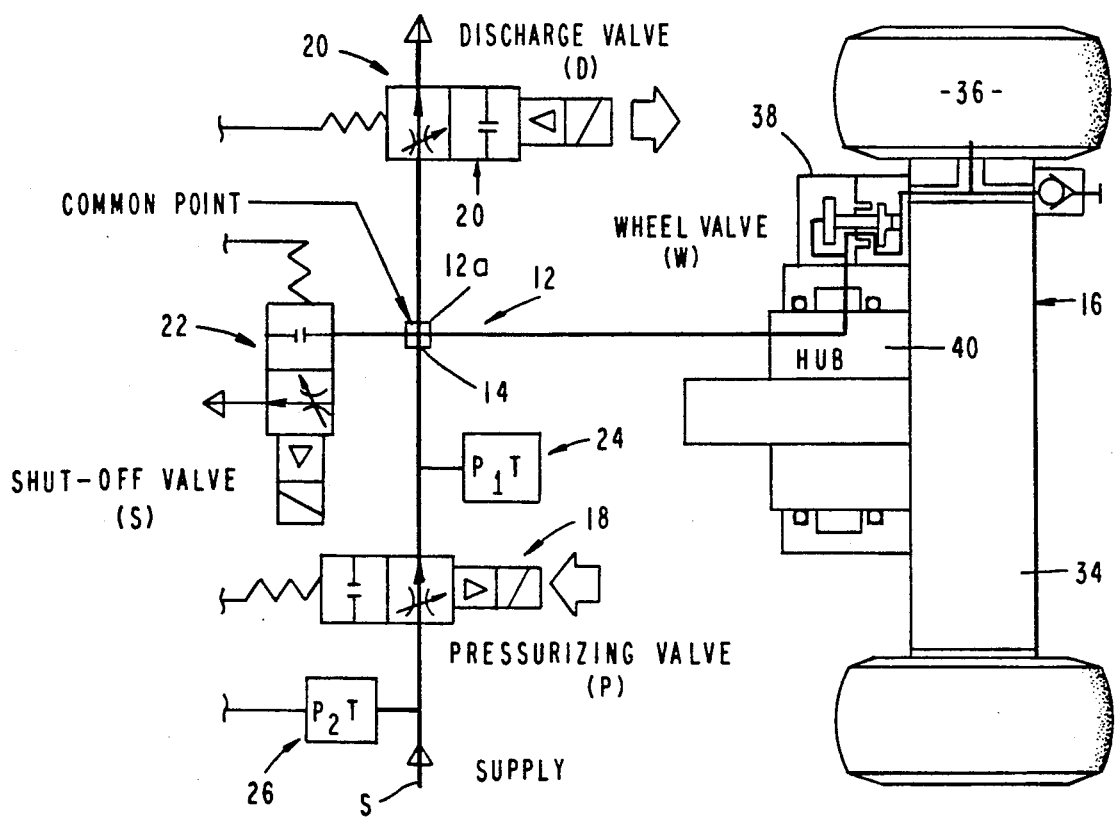
FIG. 3 is a generally schematic view similar to FIG. 2 but showing the opening of the discharge valve of the apparatus to permit tire deflation.

If, following the leak check, the transducer 24 senses that the pressure in the system is higher than the set point representing the desired pressure, the controller will transmit a signal to the discharge or deflation valve 20 causing this valve to move into an open position while the pressurizing valve 18 and the shut-off valve 22 remain in a closed position (FIG. 3). The controller again sets up the target pressure equal to the set pressure plus the offset. As air is discharged through the deflation valve 20, the tires will deflate and decrease the system pressure. This decrease in pressure is continuously monitored by pressure transducer 24 and is repeatedly compared to the target pressure. When the tire pressure is equal to the target, the controller will signal the discharge valve to move into a closed position. It is to be noted that the orifice in the discharge valve 20 is appropriately sized to maintain a back pressure in passageway 46 such that the pilot pressure in chamber 56 (FIG. 5) will always be more than one-half the pressure in chamber 54a thereby keeping the wheel valve 38 in an open position. Following equalization of the pressure within the system, the pressure is once again checked in the static, non-flow mode against the target to up date the offset. The controller will then commence the last subroutine, namely, system shut-off.

Figure 4:
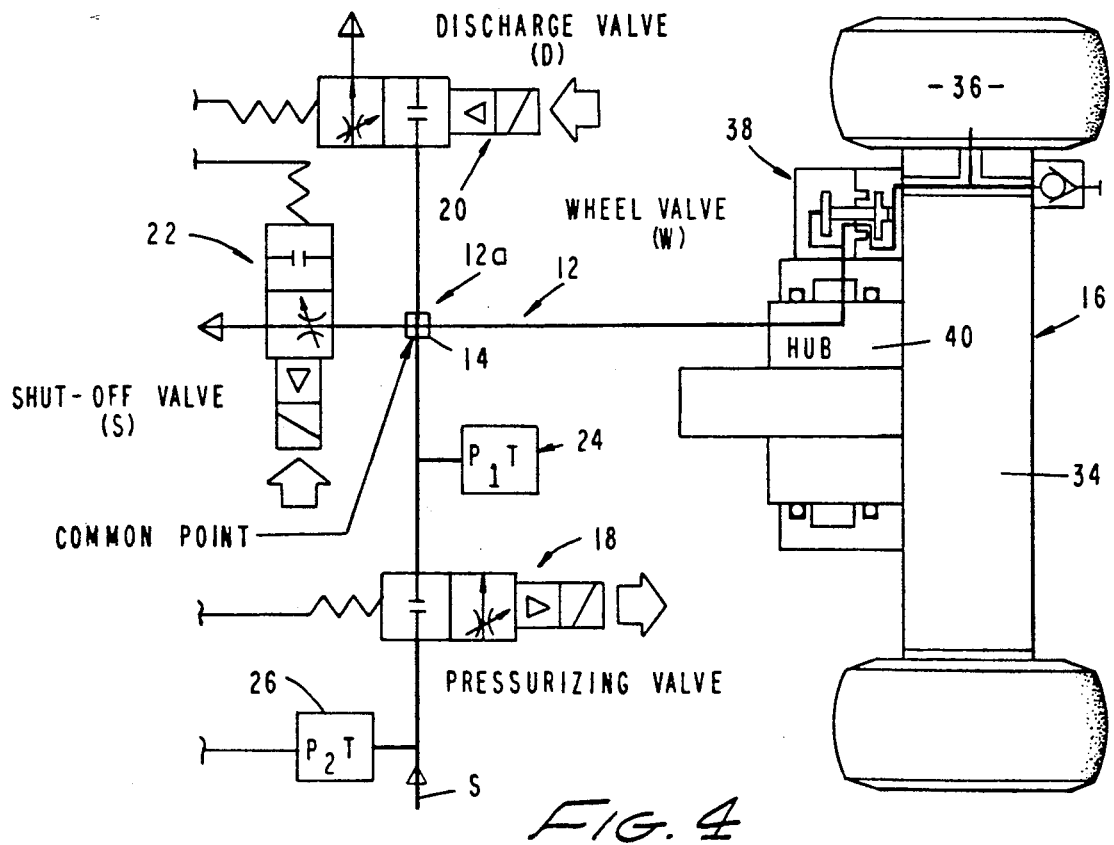
FIG. 4 is a generally schematic view similar to FIG. 3 but showing closing of the discharge valve and the pressurizing valve and opening of the shut-off valve during the shut down sequence of the apparatus of the invention.

Following completion of either an inflate or deflate sequence, the shut-off valve is de-energized by the controller and the valve moves into an open position (FIG. 4). This produces a rapid decay of pressure in the system permitting the pilot pressure in the wheel valve to decay freely causing the wheel valve to move into the closed position. However, before the shut-off valve is moved into a full open position, it is modulated by the controller in the manner previously described using an on/off sequence with each pulse being about 40 milliseconds in duration. This important step produces a shock, or jarring effect on the poppet which materially assists in the closing action particularly if the valve has become contaminated due to the accumulation of dust or fiber from the sidewalls of the tire during inflation and deflation.

The primary purpose of the second transducer 26 in the system is to provide what is normally termed "air brake priority". More particularly, transducer PT-2 or 26 constantly monitors the pressure within the air supply system and if at any time a pressure of less than about 85 psi is detected in the system, the controller sends appropriate signals to the valves to depressurize the entire system and to cause all wheel valves to instantaneously close. This condition is displayed on the panel mounted within the cab as "low air". For added safety, transducer 26 also functions to continuously monitor the supply pressure of the system when the pressurizing valve 18 is in operation. Should the supply pressure drop and the system is in inflation mode, input from this transducer 26 through the controller will modulate the pressurizing valve to reduce the output flow to maintain a supply pressure above 85 PSI. This feature prevents the system from a repeated low air priority shut off. This situation is quite common when the vehicles are traveling on street with frequent starts and stops and the air compressor output drops below 85 PSI quite frequently. Modulating the inflation air flow to reduce the frequent system shut off achieves reduced inflation times under these operating conditions.

Turning now to FIG. 7, one form of operator control means is there shown and generally designated by the numeral 85. The operator control means here comprises a panel 86, a rotary switch 89, a plurality of energizable signal lights indicating the various operating conditions that can be selected by the operator and the required circuit means for interfacing with the controller 28. The electrical connection means, the operator control means, the controller 28 and the electronic valves 18, 20 and 22 are well understood by those skilled in the art and will not be described herein. The "low air" signal light 87 previously discussed is also carried by panel 86. As previously mentioned, the operator control means functions as an input to the controller means and directs the accomplishment of one or more of the operational sequences previously described. By rotating the rotating switch, the operator can select any one of four or more tire pressure adjustments which correspond to various vehicle operating conditions, namely highway speed 91, cross-country speed 93, mud and snow speed 95 and emergency speed 97. The apparatus is operated by first switching a toggle switch 99 to the "on" position. The signal light corresponding to the position of rotary switch 89 will then light up and blink. Next, the rotary switch is turned to the desired pressure position and the start button is pushed to commence the operational sequence or pressure adjustment cycle that will provide the tire pressure that is optimum for the conditions selected by the operator. The signal light corresponding to the position of switch 89 will then start blinking to indicate that the system is performing the appropriate operating functions in accordance with the system software processor which has been designed for that operational sequence in a manner well understood by those skilled in the art. The signal light will continue to blink until the selected pressure adjustment has been completed in the manner previously discussed and the shut-off sequence is completed. The signal light will remain lit after the shut-off to provide a reference for the last completed pressure adjustment.

The controller means monitors the speed of the vehicle. If safe vehicle operating speeds are exceeded for a time period in excess of one minute, the overspeed signal will be energized and an inflation cycle will automatically begin.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without departure from the scope and spirit of the invention, as set forth in the following claims.

I claim:

1. An apparatus for adjusting the air pressure within the pneumatic tires of a vehicle having a plurality of tires, comprising:
    (a) a source of air under pressure;
    (b) a manifold assembly including:
        (i) a manifold having a chamber;
        (ii) a first valve connected to said manifold and to said source of air under pressure, said first valve being operable to place said chamber in communication with said source of air under pressure; and
        (iii) a second valve connected to said manifold assembly in communication with said chamber and with atmosphere, said second valve being operable to place said chamber in communication with atmosphere;
    (c) transducer means for measuring the pressure within said chamber and for generating a signal corresponding to the measured pressure;
    (d) a valve means disposed between said chamber and each of the pneumatic tires of the vehicle for placing each of said pneumatic tires in fluid communication with said chamber, each said valve means comprising:
        (i) a valve body having a valve seat and a first chamber defined by a sloping wall and a second chamber disposed proximate said first chamber;
        (ii) a piston reciprocally movable within said valve body relative to said first and second chambers;
        (iii) a poppet movable relative to said piston within said first chamber both longitudinally and laterally relative to said valve seat in a wobbling action;
        (iv) a resiliently deformable diaphragm connected to said valve body and to said piston for movement with said piston; and
    (e) control means connected to said transducer means, and to said first and second valves for receiving said signals generated by said transducer means and for operating said first and second valves in response to said signals in a manner such that said first valve is modulated so as to cause discrete pulses of air under pressure to be directed toward each of said valve means, whereby said poppet thereof will commence said wobbling action causing a self-cleaning wiping action between said valve seat and said poppet.

2. An apparatus as defined in claim 1 in which said control means further functions on command to cause said transducer means to measure a first pressure within said chamber, to then controllably operate said first valve so as to place said chamber in communication with said source of air under pressure for a discrete period of time, to then to cause said transducer means to measure the resultant second pressure within said chamber and finally compare said first and second pressures.

3. An apparatus as defined in claim 2 in which each said valve means further comprises:
 (a) an air inlet passageway in communication with said first chamber and with said chamber of said manifold;
 (b) an air outlet passageway in communication with one of said pneumatic tires;
 (c) a second chamber;
 (d) a passageway interconnecting said second chamber and said air inlet passageway, said passageway being substantially smaller than said air inlet passageway.

4. An apparatus as defined in claim 1 in which said transducer means comprises first and second transducers in communication with said chamber of said manifold each of said transducers being connected to said control means for transmitting signals thereto.

5. An apparatus as defined in claim 4 in which said second transducer constantly monitors the air pressure within said chamber.

6. An apparatus for adjusting the air pressure within the pneumatic tires of a vehicle having a plurality of tires, comprising:
 (a) a source of air under pressure;
 (b) a manifold assembly including:
   (i) a first valve connected to said manifold and to said source of air under pressure, said first valve being operable to place said chamber in communication with said source of air under pressure; and
   (iii) a second valve connected to said manifold assembly in communication with said chamber and with atmosphere, said second valve being operable to place said chamber in communication with atmosphere;
 (c) transducer means for measuring the pressure within said chamber and for generating a signal corresponding to the measured pressure, said transducer means comprising first and second transducers in communication with said chamber of said manifold, said second transducer being adapted to constantly monitor the air pressure within said chamber and for generating a signal corresponding thereto;
 (d) a valve means disposed between said chamber and each of the pneumatic tires of the vehicle for placing each of said pneumatic tires in fluid communication with said chamber, each of said valve means comprising:
   (i) a valve body having a valve seat and first and second chambers;
   (ii) a piston reciprocally movable within said valve body relative to said first and second chambers;
   (iii) a poppet movable relative to said piston within said first chamber both longitudinally and laterally relative to said valve seat in a wobbling action; and
   (iv) a resiliently deformable diaphragm connected to said valve body and to said piston for movement with said piston; and
 (e) control means connected to said transducer means, and to said first and second valves for receiving said signals generated by said transducer means and for operating said first and second valves in response to said signals said control means further functioning on command to cause said second transducer to measure a first pressure within said chamber, to then controllably operable said first valve so as to place said chamber in communication with said source of air under pressure for a discrete period of time, to then cause said second transducer to measure the resultant second pressure within said chamber and finally to compare said first and second pressures.

* * * * *